March 26, 1968  G. DE COYE DE CASTELET  3,374,848
VEHICLE ATTITUDE CORRECTING DEVICES
Filed Oct. 4, 1965  2 Sheets-Sheet 1
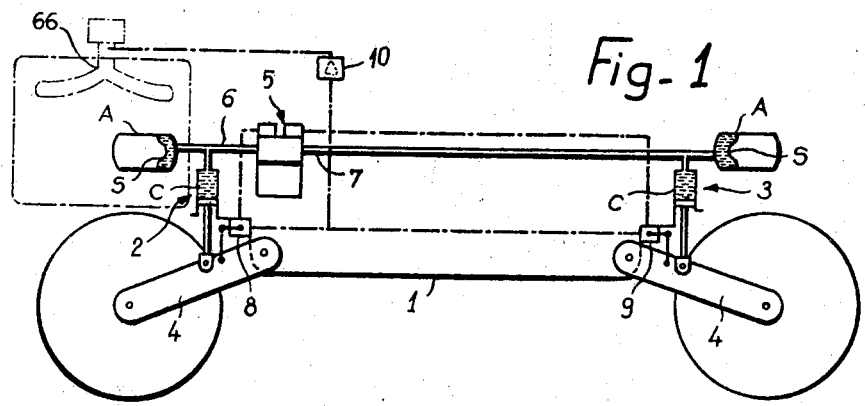
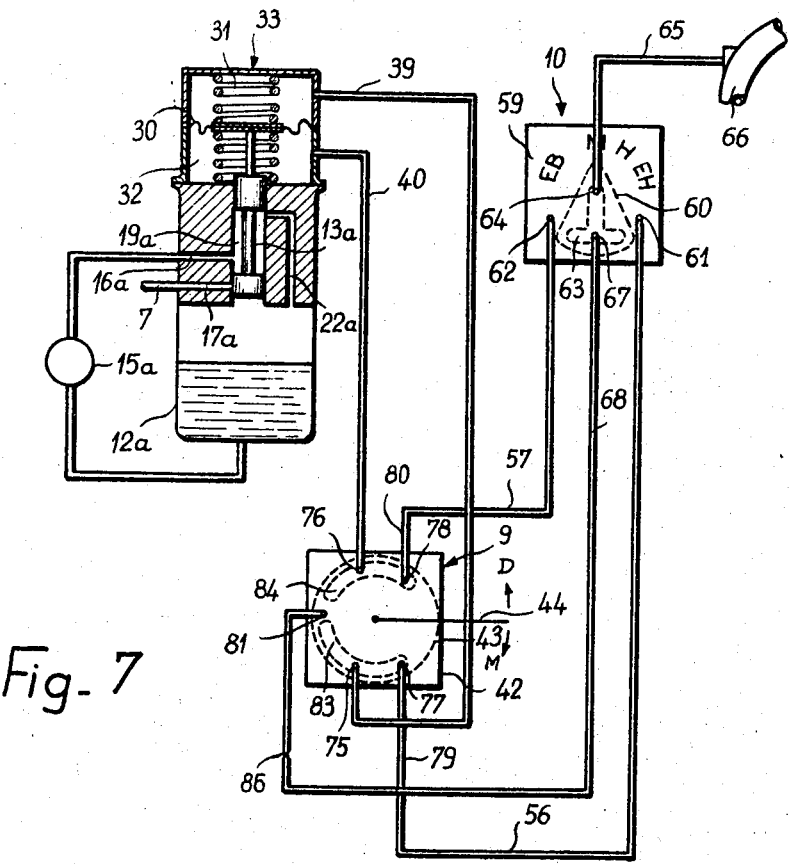
Inventor
Gaetan De Coye De Castelet
Stevens, Davis, Miller & Mosher
Attorneys March 26, 1968  G. DE COYE DE CASTELET  3,374,848
VEHICLE ATTITUDE CORRECTING DEVICES
Filed Oct. 4, 1965  2 Sheets-Sheet 2
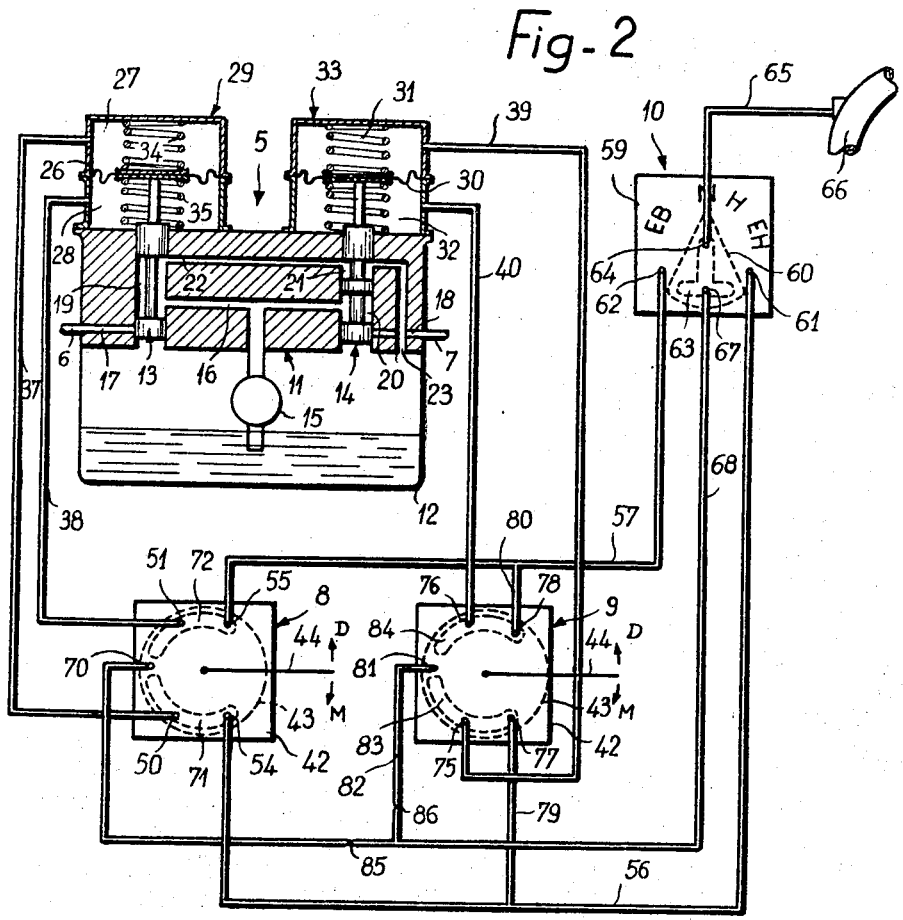
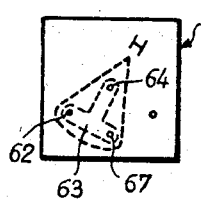
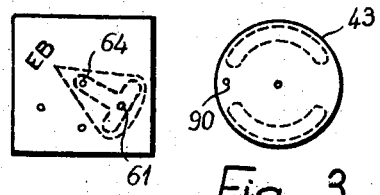
Inventor
Gaetan De Coye De Castelet
Stevens, Davis, Miller & Mosher
Attorneys United States Patent Office 3,374,848
Patented Mar. 26, 1968

3,374,848
VEHICLE ATTITUDE CORRECTING DEVICES
Gaëtan de Coye de Castelet, Billancourt, France, assignor to Regie Nationale des Usines Renault, Billancourt, Seine, France
Filed Oct. 4, 1965, Ser. No. 492,647
Claims priority, application France, Jan. 20, 1965, 2,583, Patent 1,432,614
4 Claims. (Cl. 180—41)

ABSTRACT OF THE DISCLOSURE

A device for correcting the attitude of a vehicle including hydraulic means actuated by a fluid distributor to raise and lower the vehicle frame with respect to at least two of its wheels, and a control lever movable in response to relative movements between the frame and the wheels to actuate valve means which control the operation of the distributor in response to said relative movement. Regulating means are also provided which cooperate with the valve means to regulate the desired ground clearance of the frame.

---

This invention relates to a device for correcting the attitude of a vehicle of which the suspension system of at least one set of wheels comprises pressure-fluid type vertical correcting elements, the purpose of the subject device of the invention being to ensure distribution of the pressurized fluid to said correcting elements irrespective of their type.

Primarily in order to avoid the disadvantage of a kinematic link between the pressure-fluid distributor and the wheels (since the distributor would then be operated unnecessarily, responsively to wheel movement when the vehicle is traveling), it has already been proposed that said distributor be controlled by an auxiliary circuit utilizing an air pressure other than atmospheric pressure and containing means responsive to the height of the vehicle.

This solution introduces the desirable time-delay into the distributor control system and at the same time lends itself to the obtaining, through the medium of this auxiliary control circuit, of a plurality of predetermined heights of the vehicle above the ground.

Devices of this kind were described in U.S. Patent No. 3,194,579 of July 13, 1965.

It is the object of the present invention to provide a new and advantageously simplified form of embodiment of such a correcting device.

Essentially, the invention relates to a device for correcting the attitude of a vehicle of which the suspension system of at least one set of wheels comprises pressure-fluid type height correcting elements, said device comprising a distributor of pressurized fluid to said correcting elements having a movable distributing member which can be moved, to either side of a mean position wherein said correcting elements are isolated, respectively between pressurizing and relieving position of said elements, and two chambers effective in controlling said moveable member and adapted to be set under atmospheric pressure or under an air pressure different therefrom, a valve having a movable plug responsive to the ground clearance of the vehicle level with said set of wheels whereby to control the pressure in said chambers and comprising two passages for venting said chambers to the surrounding atmosphere that are simultaneously vented for a position of normal ground clearance of the vehicle and a passage intermediate said passages and so positioned as to be connected through said plug to one or the other of said chambers according to the sense of the change in said ground clearance and after closure by said valve of the venting passage corresponding to the chamber involved, and a manually controlled selector valve to which are individually connected said two venting passages and said intermediate passage of the valve sensitive to said ground clearance, said selector valve comprising a plurality of suspension height selection positions. The device of the present invention is characterized in that the source of said different air pressure is connected to a first selector valve passage comprising a selecting member which, in said normal ground clearance position of the vehicle, interconnects said first passage with a second selector valve passage connected to said intermediate passage of said ground clearance sensing valve and which, in at least one other position corresponding to a ground clearance different from the normal clearance, is effective in interconnecting with said first and second passages one or the other of two further selector valve passages positioned on opposite sides of said second passage and respectively connected to said two venting passages.

Further, by reason of a number of other possibilities authorized by the subject device of the invention, the latter is subsidiarily characterized in that the selecting member of the selector valve includes two other positions hereinafter respectively referred to as the exceptionally high and low ground clearances, wherefor it interconnects said first passage with uniquely one or the other of said further selector valve passages, namely with one of said chamber venting passages, there being provided, on said plug of the ground clearance sensing valve, an additional venting passage which, for said exceptional ground clearance, registers with the link between said valve and whichever of said control chambers has been interconnected with said first selector valve passage.

A possible form of embodiment of an attitude correcting device according to the invention will now be more particularly described by way of example with reference to the accompanying drawing, in which:

FIGURE 1 is a schematic illustration of the front and rear suspenison systems of an attitude-corrected vehicle, showing the interconnections between the suspension systems and a correcting device according to the invention;

FIGURE 2 is a schematic detail view of the correcting device;

FIGURE 3 is a detail view of a portion of a ground clearance sensing valve;

FIGURES 4, 5 and 6 are detail views showing different operative positions of said selector valve; and FIGURE 7 is illustrative of the case where such a correcting device is applied to only one set of wheels.

Referring first to FIGURE 1, there is shown thereon a vehicle chassis 1 comprising vertically-corrected front and rear suspension systems, shown in the figure as being of a known hydropneumatic type and generally designated by reference numeral 2 for the front wheel suspension and by numeral 3 for the rear wheel suspension. Each of these suspensions comprises, intermediate a wheel arm 4 and chassis 1, a hydropneumatic unit consisting of a hydraulic cylinder C associated to a hydropneumatic element A inside which a diaphragm S separates the hydraulic fluid from a mass of compressible gas.

The units A and C of a given set of wheels are to be regarded as being hydraulically interconnected in the manner well known per se, and pressure-fluid is supplied to the hydraulic portion of the units A and C via a distributor 5, through a conduit 6 for the front suspension and through a conduit 7 for the rear suspensions.

The subject correcting device of the invention essentially encompasses this distributor 5 and its control means, which in the example shown comprise a valve responsive to the ground clearance of the vehicle above each set of wheels, namely a front valve 8 and a rear valve 9, together with a manually controlled selector valve 10 which permits the obtaining of different predetermined ground clearances for the suspensions, as will be explained hereinafter.

For illustrative purposes only and for greater clarity, the control circuit of distributor 5 including these valves is only partially schematized in dot-dash lines in FIGURE 1, and reference must be had to FIGURE 2 for a proper appreciation of the attitude-correcting device described hereinbelow.

The hydraulic distributor 5 comprises a body 11 to which is associated a reservoir 12 and in which are positioned two slides, to wit a slide 13 for controlling the front suspensions and a slide 14 for controlling the rear suspensions. A pump 15 drawing from the reservoir 12 has its delivery end connected to a conduit 16 for admitting fluid into the distributor body.

As shown in the drawing and as will be apparent later, the slides 13 and 14 are normally biased into a midway position wherein they maintain said correcting units A, C hydraulically isolated by masking the ducts 17 and 18 of body 11 to which are connected the conduits 6 and 7. Further, the inlet conduit 16 has ports permanently in the annular space 19 formed between slide 13 and its housing, and also in the annular space 20 formed between slide 14 and its housing. Slide 14 additionally forms in its housing a second annular housing 21 which normally communicates with annular space 19 via a conduit 22 and which is also connected to reservoir 12 through a conduit 23, whereby pump 15 normally discharges into said reservoir through this passage. The arrangement is such that a downward movement in FIGURE 2 of one or the other or both of slides 13 and 14 causes obturation of the pump discharge passageway (conduits 22, 23) and interconnection of one or the other, or of both ducts 17 and 18 with pump 15, i.e. the setting under pressure of the corresponding correcting units. An upward movement in FIGURE 2 of one or the other or of both slides 13 and 14 will cause one or the other or both of ducts 17 and 18, and hence the corresponding correcting units, to discharge into the reservoir while at the same time leaving the pump discharge passageway open.

It is to be noted that if the hydraulic source supplying the distributor consists, as well known per se, of a pressure accumulator set under pressure by a pump with discharge taking place upflow of the pressure accumulator, the discharge conduits 22, 23 can be dispensed with and it will suffice for the slides 13 and 14 to form only annular fluid inlet spaces such as 19 and 20, connected through the inlet conduit 16 to said pressure accumulator. Such a simplified distributor design is usable also in cases where the vertically-corrected suspension systems of a vehicle are of the kind utilizing compressed air as the correcting agent, with the source thereof being connected to said inlet conduit 16.

Distributor slide 13 is connected through a rod to a flexible diaphragm 26 which divides a chamber 29 sealed off from the surrounding atmosphere into two chambers 27 and 28. Similarly, slide 14 is connected to a flexible diaphragm 30 dividing a sealed chamber 33 into two chambers 31 and 32. The diaphragms 26, 30 carry thrust cups in their centers for opposed springs 34, 35 which urge distributor slides 13 and 14 into said normal midway position. The chambers 27, 28, 31, 32 are connected respectively through pipes 37, 38, 39, 40 to the ground clearance sensing valves 8 and 9.

As schematically illustrated in FIGURE 2, each of said valves essentially consists of a valve face 42 embodying conduits to be indicated in detail hereinafter (this unit being shown in full lines) and a rotating plug 43 of which the surface applied against the face 42 is formed with chambers cooperating with said conduits in the face 42 and which is shown in dot-dash lines in FIGURE 2.

The valve face 42 is designed to be fixed to the vehicle body, while rotating plug 43 is intended to be connected through a control lever 44 to a front or rear suspension unit that moves as a function of the movement of the wheels to which said suspension is associated.

Aside from the arrangement of valves 8 and 9 shown in FIGURE 1, and in the manner well known per se, the lever 44 may be connected to the middle of one of the vehicle axles when the suspension is used with a solid axle, or, when the wheels are independently sprung, to a lever fixed midway along a transverse torsion bar which interconnects the two wheels and which may be, for example, a commonly used anti-roll bar.

The face of valve 8 is provided with two conduits 50, 51, respectively connected through pipes 37, 38 to control chambers 27, 28 of distributor slide 13. Said face is further provided with two conduits 54, 55 respectively connected through pipes 56, 57 to selector valve 10, shown here as being of the type comprising a stationary valve face 59 and a rotating selecting member 60 shown in dotted lines. The valve face 59 is provided with two conduits 61, 62 up to which lead the pipes 56, 57 and which, in the normal position N of selecting member 60 shown in FIGURE 2, are vented to the surrounding atmosphere.

Opposite the face 59, selecting member 60 is formed with a T-shaped chamber 63 into which a first selector valve passage 64 has port permanently, said passage being connected through a conduit 65 to a source of air pressure different from atmospheric pressure and preferably consisting of the engine inlet manifold 66. In said normal position N, chamber 63 places passage 64 in communication with a second selector valve passage 67 which is intermediate the conduits 61, 62 and connected through a pipe 68 to a passage 70 of valve 8 positioned intermediate the conduits 50–54 and 51–55 thereof.

Rotating plug 43 of valve 8 is formed with two arcuate chambers 71, 72, which are adapted primarily, for a normal ground clearance of the front suspension into which valve 8 is inserted, to cause intercommunication, respectively, between conduits 50, 54 and between conduits 51, 55, it being remembered that conduits 54, 55 of valve 8 and conduits 61, 62 of valve 10 constitutes the venting passages for the distributor control chambers in said normal position N of the selector valve. For any position other than the normal ground clearance of the suspension, and depending on the sense of variation of the ground clearance (shown by the arrows D and M for downward and upward motion of lever 44), the arcuate chambers 71, 72 are caused to place, in communication with intermediate passage 70, one or the other of said distributor control chambers by either of conduits 50 or 51 subsequent to masking of the corresponding venting passage 54 or 55.

The valve 9 inserted into the rear suspension has its valve face formed with conduits 75, 76 up to which said pipes 39 and 40 lead, and has interconnections with selector valve 10 similar to those of valve 8 with the latter. The valve face of valve 9 is thus provided with two conduits 77, 78, respectively connected through pipes 79, 56 and 80, 57 to the conduits 61 and 62 of valve 10. Similarly, the valve face is provided with a passage 81 intermediate conduits 75, 77 and 76, 78 which is connected through pipes 82 and 68 to the passage 67 of valve 10. The plug 43 of the valve 9 is formed with two arcuate chambers 83, 84, respectively cooperating with conduits 75, 77 and 76, 78, as well as with passage 81, in the same manner as that described in respect of valve 8.

The correcting device hereinbefore described functions as follows:

As already stated, valves 8 and 9 are shown in FIGURE 2 as being in their midway position corresponding to a predetermined normal ground clearance of the vehicle body at the front and the rear, and the selector valve is placed in its corresponding position N. With the device in this configuration, the control chambers of distributor 5 are vented and the suspensions hydraulically isolated due to the slides 13 and 14 masking the conduits 17 and 18.

Assuming the vehicle to be stationary under these conditions with the engine running, then if the load is increased to the point of causing the body of the vehicle to drop at the front and the rear, levers 44 of valves 8 and 9 will be simultaneously shifted in the direction of arrows D.

If this drop is such that the rotating plugs 43 of these valves mask the conduits 55 and 78 and that the chambers 72 and 84 register with the passages 70 and 81, then control chambers 28 and 32 will be set under negative pressure through the pipe 68 common to valves 8 and 9 and the intercommunicating passages 67 and 64 for selector valve 10, while control chambers 27 and 31 will remain vented to the surrounding atmosphere through the valves 8 and 9 and the pipe 56 connected to selector valve passage 61. As a result, slides 13 and 14 will be moved downwardly in FIGURE 2, thereby masking the pump discharge passage (conduits 22, 23) and uncovering ducts 17 and 18.

The units A and C of the front and rear suspensions will then be supplied hydraulically and will raise the vehicle body until the valves 8 and 9 are restored to their initial midway positions through the levers thereof being shifted in the opposite direction to arrow D.

Conversely, when a reduction in the load on the vehicle causes the vehicle body to rise at the front and the rear, levers 44 of valves 8 and 9 will be shifted in the direction of arrow M, and when the chambers 71 and 83 of plugs 43 cease to register with the conduits 54 and 77 and register with passages 70 and 81, chambers 27 and 31 will be set under negative pressure relative to the still vented chambers 28 and 32. As a result, slides 13 and 14 will be moved upwardly in FIGURE 2, leaving the pump discharge passage 22, 23 open and uncovering the ducts 17 and 18 through which the front and rear suspension units A and C can discharge hydraulically into the reservoir 12. This causes the vehicle body to drop until valves 8 and 9 are restored to their initial midway positions corresponding to the predetermined normal ground clearance of the vehicle body.

It is to be noted that the vehicle attitude correction is effected with complete independence of the front and rear suspensions; in other words, the hydraulic elements of one suspension for instance may be set under pressure while those of the other are relieved, or the hydraulic elements of one suspension may be set under pressure (or relieved) while those of the other remain in the normal position.

It should be noted further that controlling the distributor by utilizing the engine-induced depression readily permits time-delaying of the movements of the distributor slides 13, 14 beyond their normal midway positions, by reason of the response time inherent in such a depression-type control. In addition, this time-delay can be adjusted by providing fine jets 85, 86 in the pipes 68 and 82.

In contradistinction, the slides 13, 14 revert to their normal midway positions relatively rapidly, since the air returns into the control chambers, without being appreciably restrained, through valve 8 or 9 when the vehicle reverts to its normal ground clearance.

These various arrangements obviate any hunting (oscillatory) phenomena in the course of restoring the normal attitude of the vehicle, and prevent accidental operation of the distributor while the suspension is working.

Further, when the engine is stopped, the springs 34, 35 maintain the distributor slides 13, 14 in their midway positions wherein the units A and C are hydraulically isolated.

It is to be noted that the ground clearance of the vehicle, which is automatically adjusted at the front and rear by the operation of valves 8 and 9, is dependent upon the manner of fitting the latter and can therefore be made adjustable at will by operating in particular on the connection between levers 44 and the mobile parts of the corresponding suspensions, it being notably possible to make the length of said connection variable for the purpose.

Furthermore, one particular feature of the invention is that selector valve 10 permits the obtaining of at least one other ground clearance different from normal, by placing one or the other of the passages 61 or 62 of selector valve 10 in communication with the passages 64 and 67 of the latter, depending on the desired sense of the change in ground clearance. This possibility is here utilized, in the exemplary constructional form shown in the drawing, for obtaining a so-called high position providing a greater than normal ground clearance in case of need, corresponding to a position H of the selecting member of valve 10 and represented separately in FIGURE 4 for greater clarity.

In this position H the chamber 63 of selecting member 60 causes passages 64, 67 and 62 to intercommunicate, whereby the pipes 57 and 68 are linked to the negative pressure source. With the vehicle body assumed to be at normal height, i.e. with valves 8 and 9 in the position shown in FIGURE 2, the distributor control chambers 28 and 32 will first be set under negative pressure through the chambers 72 and 84 of these valves, whereas control chambers 27 and 31 will remain vented. As a result, distributor slides 13 and 14 will be moved in the direction corresponding to a setting under hydraulic pressure of the front and rear suspensions through the ducts 17 and 18. The corresponding units A and C will then increase the ground clearance of the vehicle body, i.e. the valve levers 44 will be shifted in the direction M until the chambers 71 and 83 of valves 8 and 9, after having uncovered the conduits 54 and 77 of the latter, register with the intermediate passages 70, 81 thereof. This in turn will set control chambers 27 and 31 under negative pressure, and since control chambers 28 and 32 remain likewise under negative pressure, the slides 13 and 14 will be restored to their neutral positions responsively to springs 34, 35, whereby said high position of the vehicle reached in this way will be maintained for as long as selector valve 10 remains in position H.

Another feature of the invention is that a preferred and advantageous utilization layout employed in association with that described above permits of additionally obtaining, in a simple way, two so-called exceptionally high or low clearance positions for which the selector valve must be placed in the positions EH or EB indicated in FIGURES 5 and 6. To that end there is provided on each plug 43 valves 8 and 9, between said arcuate chambers, an orifice 90 (see FIGURE 3) which is positioned at the same distance from the center of the valve as the conduits 50, 51 of valve 8 or 75, 76 of valve 9. Thus orifice 90 registers with said conduits under the conditions as set forth hereinbelow.

Assuming the vehicle to be at normal height, when the selecting member of valve 10 is placed in the position EH chamber 63 causes passages 64 and 62 to intercommunicate whereby the distributor control chambers 28 and 32 are set under negative pressure through pipe 57, chambers 72 and 84 of valves 8, 9, and pipes 38, 40.

Since chambers 27 and 31 are vented, the distributor slides 13 and 14 will be moved in the direction causing the front and rear suspension to be set under hydraulic pressure and the vehicle body to rise, i.e. the levers 44 and hence the plugs 43 of valves 8 and 9 will be shifted in the direction M. It will be noted that the control chambers 28 and 32 remain vented not only when the chambers 71, 83 of valves 8, 9 cease to register with conduits 54, 77 but also when they register with the passages 70, 81 which are vented via passage 67 of valve 10. The process of raising the vehicle will in effect cease when, after chambers 72 and 84 of valves 8 and 9, first cease to cover conduits 51 and 76 the latter register with the orifices 90 of plugs 43 and thereby suddenly vent the previously negatively pressurized chambers 28, 39 through the pipes 38, 40. As a result, slides 13 and 14 will be restored to their neutral positions and the said exceptionally high position reached in this manner will be maintained for as long as selector valve 10 remains in position EH.

The strict converse in operation will be obtained by placing the selecting member on valve 10 in position EB shown in FIGURE 6, when the process of lowering the vehicle to its exceptionally low position will cease when the orifices 90 of plugs 43 register with conduits 50 and 75 of the valve faces of valves 8 and 9.

In both these cases of shutting off the valves 8 and 9 responsively to position EH and EB of selector valve 10, it will be seen that it will suffice for the arcuate chambers which move to cover intermediate passages 70, 81 to continue nonetheless to cover the corresponding conduits 50, 75 or 51, 76 (providing the links with the distributor control chambers), for the reverting of the selector valve to position N, for example, to normally cause a reverting of the vehicle body to normal ground clearance.

The main purpose of these positions EH and EB is to enable wheel changing operations to be carried out readily with such a vehicle suspension system. This operation consists in raising the body to its exceptionally high position (EH), then in propping up the body on the side on which the wheel is to be changed and in then relieving the suspensions (EB) in order to cause the required wheel to rise off the ground.

It should be noted that in the normal position N, the manner of operation described above remains unchanged and that, despite the registering of orifices 90 with passages 70 and 81 of valves 8 and 9 in the midway positions of the latter, the suspension correcting function remains independent even if one suspension should be at normal ground clearance. This is achieved through the provision of the jets 85 and 86, i.e. through the difference in pressure relative to atmospheric pressure which one or the other of said jets helps to create by constriction when one or the other of the corresponding passages 70 or 81 remains vented.

Alternatively, the orifices 90 and the passages 70 and 81 can be arranged to prevent them from registering, as will be explained hereinafter.

Manifestly, an attitude-correcting device of this type could be applied only to the suspension used for one set of wheels, notably to the rear suspension which is most subject to changes in height. Such a form of application is shown in FIGURE 7 and utilizes a slide-type hydraulic distribution circuit similar to that of the front suspension in the previous instance, like parts being designated by like numerals followed by the suffix *a*. Further, the control circuits and members of slide 13*a* are identical to those utilized for the rear suspension and are designated by like reference numerals.

What is claimed is:

1. A device for correcting the attitude of a vehicle, said device comprising a suspension system connecting the vehicle frame to at least two of the vehicle wheels at a predetermined ground clearance, said suspension system including fluid pressure responsive hydraulic means to raise and lower said frame with respect to at least two of said wheels; a fluid distributor for controlling said hydraulic means and including a pair of chambers and a distributing member movable in response to changes in pressure differentials in said chambers; at least one control lever operatively connected to said suspension system and movable in response to relative movements between said frame and said wheels; valve means responsive to movement of said control lever; a first set of conduit means connecting said valve means to said chambers; at least two external sources of air at different pressures; regulating means isolated from said chambers and having a variable air pressure output to regulate said predetermined ground clearance; means connecting said sources of pressure solely to said regulating means; and a second set of conduit means connecting said regulating means to said valve means, said valve means adapted to selectively connect at least one of said first set of conduit means to at least one of said second set of conduit means to regulate the pressure differentials in said chambers and therefore actuate said hydraulic means in response to said relative movements.

2. A vehicle attitude correcting device according to claim 1, wherein said second set of conduit means comprises a plurality of venting passages connecting said valve means and said regulating means, and wherein said regulating means is in the form of a manually controlled selector valve to which said venting passages are connected, said selector valve having a plurality of selector passages and being movable to selectively connect various combinations of said venting passages and air sources corresponding to a plurality of suspension height selection portions.

3. A vehicle attitude correcting device according to claim 2, wherein said first set of conduit means comprises a connecting passage extending from each of said chambers into said valve means, said valve means adapted to selectively connect at least one of said venting passages to at least one of said connecting passages to regulate the pressure differentials in said chambers and therefore actuate said hydraulic means in response to said relative movements.

4. A vehicle attitude correcting device according to claim 1, wherein one of said sources of air is the vehicle engine inlet tract, and another source is atmosphere.

References Cited

UNITED STATES PATENTS 3,194,579  7/1965  Peras _____ 280—104

A. HARRY LEVY, *Primary Examiner.*